F. S. WESTER.
CLOTHESHOOK.
APPLICATION FILED JAN. 15, 1919.

1,333,692.

Patented Mar. 16, 1920.

INVENTOR:
FELIX S. WESTER
BY: H van Detmund
ATTORNEY.

UNITED STATES PATENT OFFICE.

FELIX SEVERIN WESTER, OF VAASA, FINLAND.

CLOTHESHOOK.

1,333,692.  Specification of Letters Patent.  Patented Mar. 16, 1920.

Application filed January 15, 1919. Serial No. 271,253.

*To all whom it may concern:*

Be it known that I, FELIX SEVERIN WESTER, a citizen of the State of Finland, resident of Vaasa, Finland, have invented a new and useful Clotheshook; and I do hereby declare the following to be a full, clear, and exact description of the same.

This invention relates to improvements in portable supports for clothes, one feature of the invention being the provision of a one-piece S-shaped hook having at one terminal thereof a sharp point adapted to pierce the support for the hook and whereby the hook is suspended from said support, and having at the other terminal thereof a smooth ball-shaped member to prevent the clothes supported thereby from being torn thereon. The hook also has a flat steadying surface on the part of the lower loop which engages with the support for the hook to prevent the hook from turning about the sharp point.

Another feature is an improved arrangement whereby the hook may be mounted on a rod or pipe instead of on wood-work by the sharp point, in cases where this is convenient.

A further feature is the provision of a protecting cap for the sharp point adapted to frictionally engage the point, and flexible means, preferably a chain, for connecting the cap to the body of the hook, one end of the flexible member being connected to the body of the hook and the other end being connected to the cap. The chain is adapted to bridge and close the upper loop of the S-shaped hook when in position on the cap. When the hook is supported by means of the upper loop and the cap is replaced on the point, the flexible member will prevent the accidental removal of the hook from the rod or pipe support.

The clothes supporting member comprises a rod bent to form an integral or one-piece S-shaped hook $a$. One terminal of the hook is provided with a sharp point $d$ adapted to be forced into the wood-work to which the hook is to be attached, and whereby the hook may be supported thereon when desired. The other terminal of the hook is provided with a smooth ball-shaped member over which the clothes are placed to be supported on the hook and which serves to protect the clothes from being torn by the hook.

Figure 1:
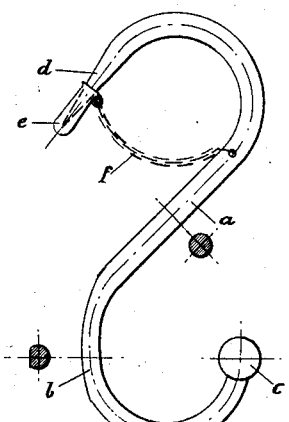
Figure 1 is a side view of the supporting hook, showing the protecting cap in position on the sharp point.
Figure 2:
Fig. 2 is a front view of the hook shown in Fig. 1.
Figure 3:
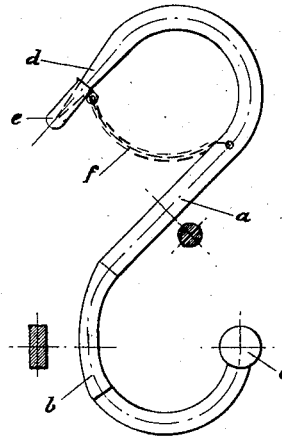
Fig. 3 is a side view of the hook but showing the flat steadying portion slightly extended.
Figure 4:
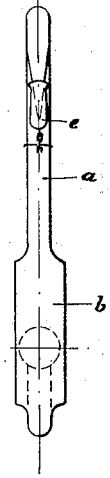
Fig. 4 is a front view of the hook shown in Fig. 3.

In order to steady the hook when it is supported by means of the sharp point, the part of the lower loop which engages the wood-work, which supports the hook, may be made flat as shown in Fig. 1, or flat and extended as shown in Fig. 3. It will be seen that this flat surface will tend to prevent the hook from turning, especially if the flat surface is extended as shown in Fig. 3.

A protecting cap $e$ is adapted to be placed on and to frictionally engage the point $d$, so as to protect both the point itself and the pocket of the person carrying the hook. This cap $e$ is connected to the body of the hook by means of a chain $f$, one end of which is secured to the body of the hook and the other end of which is secured to the cap.

The hook is also adapted to be supported on a cylindrical member of suitable dimensions, such as a rod or pipe, by placing the upper loop thereof over said member. This is done while the cap $e$ is removed from the point $d$. When the cap is replaced on the point, the chain $f$ which bridges and closes the upper loop, prevents the accidental removal of the hook from the rod.

I claim as my invention:

A portable clothes holder, comprising a one-piece S-shaped hook, one terminal of which is sharp and pointed to pierce a support for the hook and whereby the hook is suspended from said support, the other terminal of said hook being rounded and smoothed to protect the clothes supported thereby against being torn thereon; a flat steadying surface on the part of the hook which engages with the hook-support to prevent the hook from turning about said sharp point, the upper loop of the hook being adapted to be alternatively placed over and supported by a rod or pipe; a protecting cap adapted to be placed over the sharp point and to be tightly held thereon; and a flexible member connecting said cap to the body of said hook to prevent separation of the cap from the hook while permitting the cap to be removed from said sharp point, said flexible member being adapted to bridge and close the upper loop of the hook when the cap is fitted on the sharp
5 point to prevent the accidental removal of the hoop from the rod or pipe.

In testimony whereof, I have signed my name to this specification in the presence of two subscribing witnesses.

FELIX SEVERIN WESTER.

Witnesses:
 JENNY AHO,
 RAGNAR ERICSON.